United States Patent
Cadarette et al.

(10) Patent No.: US 10,108,689 B2
(45) Date of Patent: *Oct. 23, 2018

(54) WORKLOAD DISCOVERY USING REAL-TIME ANALYSIS OF INPUT STREAMS

(71) Applicant: International Business Machines Corporation, Armonk, NY (US)

(72) Inventors: Paul M. Cadarette, Hemet, CA (US); James D. Spyker, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/347,713

(22) Filed: Nov. 9, 2016

(65) Prior Publication Data

US 2017/0177691 A1    Jun. 22, 2017

Related U.S. Application Data

(63) Continuation of application No. 14/974,276, filed on Dec. 18, 2015, now Pat. No. 9,514,180.

(51) Int. Cl.
*G06F 17/30* (2006.01)

(52) U.S. Cl.
CPC .. *G06F 17/30578* (2013.01); *G06F 17/30368* (2013.01); *G06F 17/30371* (2013.01)

(58) Field of Classification Search
None
See application file for complete search history.

(56) References Cited

U.S. PATENT DOCUMENTS

| | | | |
|---|---|---|---|
| 7,366,742 B1 | 4/2008 | Umbehocker et al. | |
| 8,194,552 B1 | 6/2012 | Ye et al. | |
| 8,863,224 B2 | 10/2014 | Hecht et al. | |
| 2005/0228879 A1 | 10/2005 | Cherkasova et al. | |
| 2008/0270595 A1 | 10/2008 | Rolia et al. | |
| 2008/0282321 A1 | 11/2008 | Hecht et al. | |
| 2010/0082513 A1* | 4/2010 | Liu ................... | H04L 63/1458 706/46 |

(Continued)

FOREIGN PATENT DOCUMENTS

WO    WO2007060664 A2    5/2007

OTHER PUBLICATIONS

Branch, How to Simply Complex Tasks and Make Challenges Easier, date unknown [captured by archive.org on Jan. 4, 2014], Personal Development 123, https://web.archive.org/web/20140104185003/http://www.danielbranch.com/simplify-complex-tasks/.*

(Continued)

*Primary Examiner* — Jason G Liao
(74) *Attorney, Agent, or Firm* — Janaki K. Davda; Konrad, Raynes, Davda & Victor LLP

(57) ABSTRACT

Provided are techniques for workload discovery using real-time analysis of input streams. For a meta workload, changes to data objects made by change operations that are in a replication change stream are stored into a recovery log. Using an analytics engine, one of the recovery log and the replication change stream are analyzed to identify associations between the data objects based on usage and access patterns. The associations are used to identify sub-workloads of the meta workload that form consistency groups for replication.

17 Claims, 5 Drawing Sheets

(56) References Cited

U.S. PATENT DOCUMENTS

2014/0237550 A1 8/2014 Anderson et al.
2015/0007261 A1 1/2015 Hecht et al.
2015/0127612 A1 5/2015 Balcha et al.

OTHER PUBLICATIONS ip.com, "A Method and System for Real-time Discovery System", Jan. 6, 2015, An IP.com Prior Art Database Technical Disclosure with IP.com No. 000240141, available at: <URL: http://ip.com/IPC0M/000240141>, Total 4 pp.
Mell, P. and T. Grance, "The NIST Definition of Cloud Computing (Draft)", Sep. 2011, Computer Security Division Information Technology Laboratory National Institute of Standards and Technology, Total 7 pp.
U.S. Appl. No. 14/974,276, filed Dec. 18, 2015, entitled, "Workload Discovery Using Real-Time Analysis of Input Streams", invented by P.M. Cadarette et al., Total 28 pp.
Notice of Allowance, Aug. 12, 2016, for U.S. Appl. No. 14/974,276, filed Dec. 18, 2015 by P.M. Cadarette et al., Total 7 pp.
IP.com, "A Method and System for Real-time Discovery System", Jan. 6, 2015, an IP.com Prior Art Database Technical Disclosure with IP.com No. 000240141, available at: <URL: http://ip.com/IPCOM/000240141>, Total 4 pp.
IP.com, "Method to Manage Analytics Data Collection of Large System Workloads", Jun. 8, 2015, an IP.com Prior Art Database Technical Disclosure with IP.com No. 000241913, available at: <URL: http://ip.com/IPCOM/000241913>, Total 4 pp.
Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
Mell, P. and T. Grange, "The NIST Definition of Cloud Computing (Draft)", Sep. 2011, Computer Security Division Information Technology Laboratory National Institute of Standards and Technology, Total 7 pp.
List of IBM Patents or Patent Applications Treated as Related, Total 2 pp., Nov. 9, 2016.
U.S. Patent Application with U.S. Appl. No. 14/974,276, filed Dec. 18, 2015, entitled, "Workload Discovery Using Real-Time Analysis of Input Streams", invented by P.M. Cadarette et al., Total 28 pp.
Office Action 1, dated May 10, 2016, for U.S. Appl. No. 14/974,276, filed Dec. 18, 2015 by P.M. Cadarette et al., Total 18 pp.
Response to Office Action 1, dated Jul. 27, 2016, for U.S. Appl. No. 14/974,276, filed Dec. 18, 2015 by P.M. Cadarette et al., Total 12 pp.
Notice of Allowance, dated Aug. 12, 2016, for U.S. Appl. No. 14/974,276, filed Dec. 18, 2015 by P.M. Cadarette et al., Total 7 pp.
Meta Workload—Google Search May 2, 2016, Google, https://www.google.com/?gws_rd=ssl#q=meta+workload.
Meta-Workload—Google Search May 2, 2016, Google, https://www.google.com/?gws_rd=ssl#q=meta-workload.

\* cited by examiner

WORKLOAD DISCOVERY USING REAL-TIME ANALYSIS OF INPUT STREAMS

FIELD

Embodiments of the invention relate to workload discovery using real-time analysis of input streams. In various embodiments, the input streams may be recovery logs or replication log streams.

BACKGROUND

An Active/Active continuous availability environment describes a network of independent processing nodes, in which each of the nodes has access to a replicated database giving each of the nodes access and usage of a single application. In an Active/Active continuous availability environment, all requests are load-balanced across all available processing capacity. In an Active/Active continuous availability environment, mission-critical applications, known as 'workloads', may be deployed on two or more sites, separated by great distances, at the same time. A site, may be one or more computer systems, typically in a cluster configuration, within a physical region, and the region scope may be within a building or within a geographic location (e.g., a city).

The granularity of processing for Active/Active continuous is the workload. Workloads are synchronized, across sites, using replication products in an asynchronous, loosely-coupled fashion. Inbound On-Line Transaction Processing (OLTP) work is routed to a particular instance of a workload at one of the sites, and monitoring software provides for both the monitoring of workload health, as well as, the detection of workload outages. Lastly, user policies are prescribed on a workload basis. Workloads are defined as the set of applications that perform updates against a given set of data objects, using the same network addressability objects. Data objects may be described as a logically related set of records, or rows, within a given logical or physical construct. Examples of data objects include constructs of files, tables or database instances.

One of the tasks in preparing for an Active/Active continuous deployment is the identification of the workloads. In particular, the task is identifying the set of data objects (e.g., data sets, files, tables, databases, etc.) that belong to each workload and, as such, constitute a 'consistency group'. The term, consistency group, refers to the assumed requirement that updates to all objects within the group are executed such that the target copy is an exact replica of the source copy, at a given point in time.

A difficulty with defining the consistency group (and by extension, a workload), is that large enterprises struggle with maintaining accurate descriptions of their application's usage and access patterns. It is common for customers to default to defining a single workload, encompassing all of the data objects in the enterprise.

The problem of workload discovery is not limited to Active/Active continuous environments, but is a problem for most, if not all, software replication scenarios. The definition of the smallest set of related objects, for the purpose of point-in-time consistency, is common to heterogeneous replication, homogeneous replication, and many event publishing replication use-cases.

SUMMARY

Provided is a method for workload discovery using real-time analysis of input streams. The method comprises: for a meta workload, storing, with a processor of a computer, changes to data objects made by change operations that are in a replication change stream into a recovery log; analyzing, using an analytics engine, one of the recovery log and the replication change stream to identify associations between the data objects based on usage and access patterns; and using the associations to identify sub-workloads of the meta workload that form consistency groups for replication.

Provided is a computer program product for workload discovery using real-time analysis of input streams. The computer program product comprises a computer readable storage medium having program code embodied therewith, the program code executable by at least one processor to perform: for a meta workload, storing, with a processor of a computer, changes to data objects made by change operations that are in a replication change stream into a recovery log; analyzing, using an analytics engine, one of the recovery log and the replication change stream to identify associations between the data objects based on usage and access patterns; and using the associations to identify sub-workloads of the meta workload that form consistency groups for replication.

Provided is a computer system for workload discovery using real-time analysis of input streams. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations, wherein the operations comprise: for a meta workload, storing, with a processor of a computer, changes to data objects made by change operations that are in a replication change stream into a recovery log; analyzing, using an analytics engine, one of the recovery log and the replication change stream to identify associations between the data objects based on usage and access patterns; and using the associations to identify sub-workloads of the meta workload that form consistency groups for replication.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
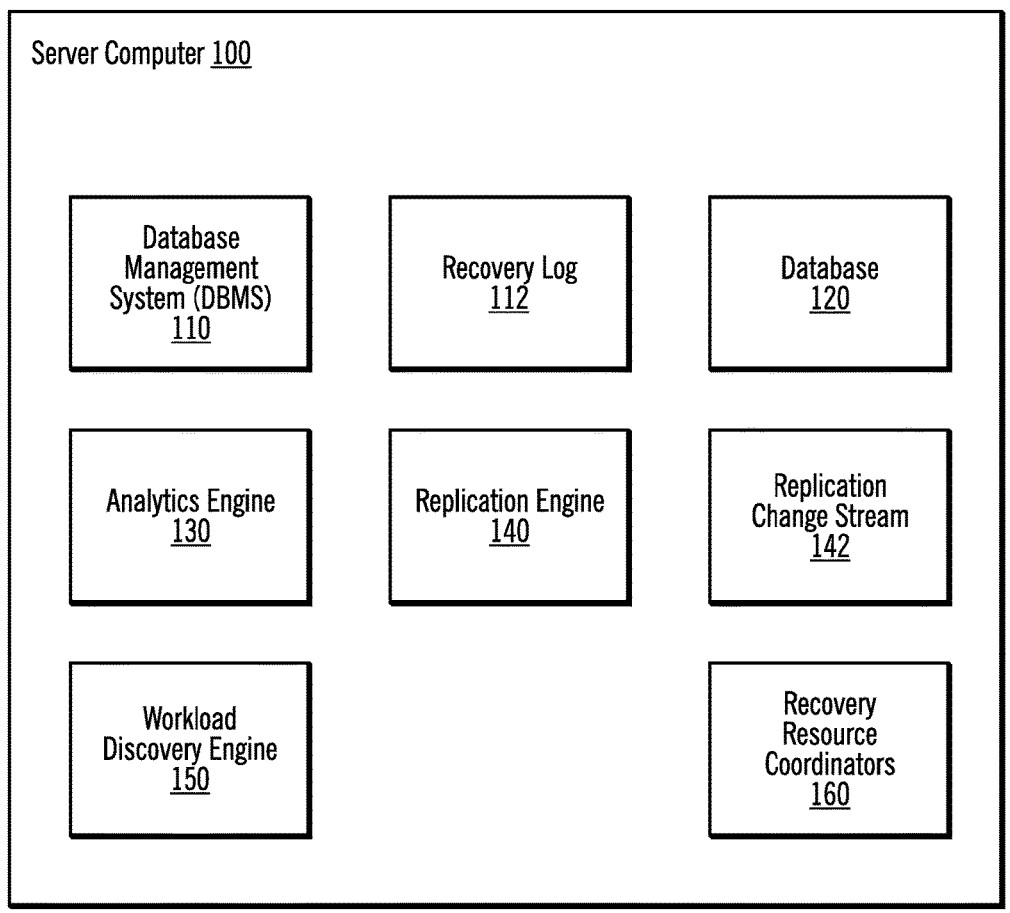
FIG. 1 illustrates, in a block diagram, a computing environment in accordance with certain embodiments.

FIG. 1 illustrates, in a block diagram, a computing environment in accordance with certain embodiments. The server computer 100 includes a Database Management System (DBMS) 110, a recovery log 112, a database 120, an analytics engine 130, a replication engine 140, a replication change stream 142, a workload discovery engine 150, and resource recovery coordinators 160. The DBMS 110 makes changes to the database 120, and these changes are recorded in the recovery log 112. The replication engine 140 replicates (copies) data from the database 120 to another database.

In certain embodiments, the server computer 100 may be a source system in a distributed replication environment, and the database 120 may be a source database. In other embodiments, the server computer 100 may be a target system, and the database 120 may be a target database. With embodiments, an Active/Active continuous availability environment requires a distributed replication environment with a source system and a target system for replication between them.

The analytics engine 130 may either run directly in the replication engine 140 or as a standalone utility. The analytics engine 130 analyzes log records of the recovery log 112 and/or the replication change stream 142 to detect both simple and complex associations. The replication engine 140 produces a replication change stream 142 by reading the recovery log 112 and doing analysis on those log records. The basic analysis is subset selection (e.g., what data objects are of interest?) and in maintaining transactional semantics. Embodiments add in analytics of the replication change stream contents (or the original recovery log) as compared to the target database data, so as to determine logical associations between data objects conflicts (discrepancies) and perform resolution.

The recovery log 112 may also be referred to as a DBMS audit/recovery log. The replication change stream 142 may also be referred to as a replication engine change stream. The database 120 includes an index and data.

Embodiments provide the workload discovery engine 150 (which may be a utility) to aid customers in creating and maintaining workload definitions. Embodiments use high performance streaming analytics engines, such as the analytics engine 130, to do a real-time analysis, in the replication engine 150, of usage/access patterns of a given meta workload (e.g., a monolithic workload with all objects) so as to identify sub-workloads. The high performance streaming analytics engines perform analysis 1) while the meta workload is executing or 2) on static logs. Typically, the DBMS 110 is available, in case the analysis needs to pull meta information from the DBMS 110 or from other sources. This workload discovery process, along with external information, such as other application properties (e.g. network addresses, etc.) allows for the partitioning of a single, monolithic meta workload into several workloads. This increased granularity increases performance and operational flexibility. Furthermore, for those identified sub-workloads that cannot be partitioned, because of shared properties (e.g. network addressability), their identification allows for increased parallelization of processing within the meta workload.

The workload discovery engine 150 uses analytics to discover workload boundaries using input streams (e.g., the recovery log 112 or the replication change stream 142). In one embodiment, these analytics are performed against a replication change stream 142 of the replication engine 140, that originates from the recovery log 112, for a given defined meta workload, with the intent to identify sub-workloads for partitioning and/or optimized processing.

In another embodiment, these analytics are performed directly against the recovery log 112, with the intent to provide for out-of-band workload identification for partitioning and sub-workloads for replication optimization.

Both embodiments employ similar techniques for workload discovery, although their source inputs and output vary.

Figure 2:
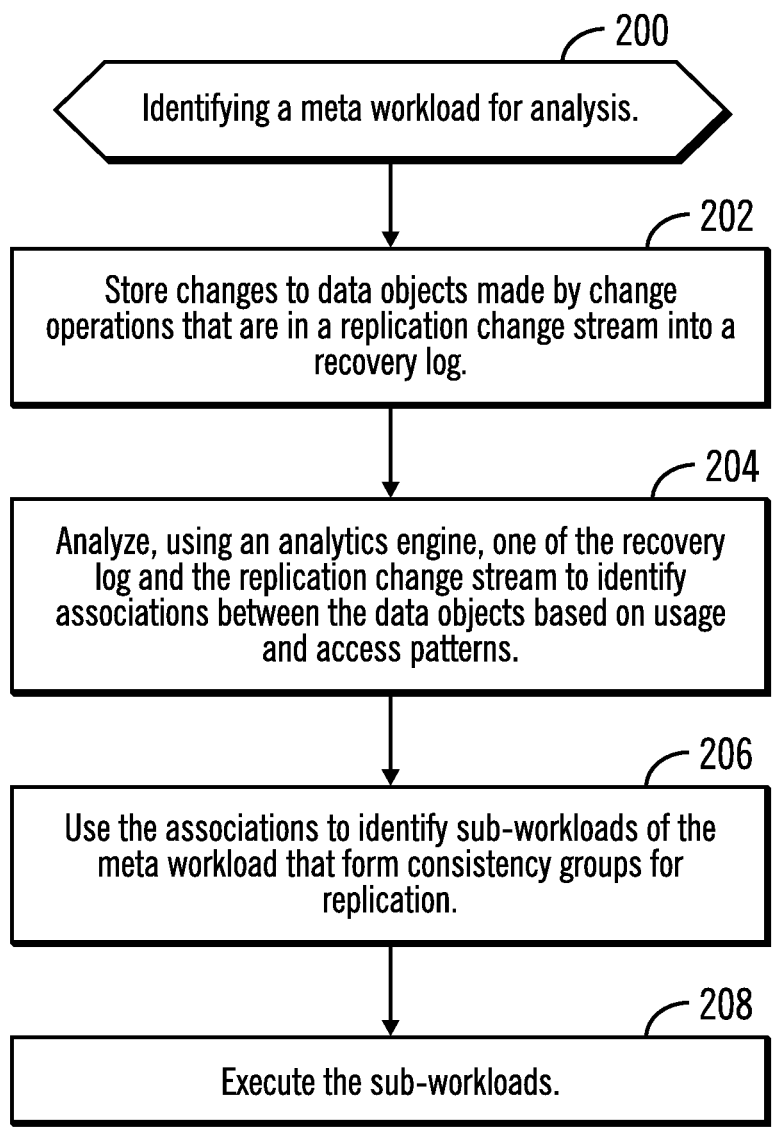
FIG. 2 illustrates, in a flowchart, operations for identifying sub-workloads in accordance with certain embodiments.

FIG. 2 illustrates, in a flowchart, operations for identifying sub-workloads in accordance with certain embodiments. Control begins at block 200 with the workload discovery engine 150 identifying a meta workload for analysis. In block 202, the workload discovery engine 150 stores changes to data objects made by change operations that are in a replication change stream into a recovery log. In block 204, the workload discovery engine 150 analyzes, using an analytics engine, one of the recovery log and the replication change stream to identify associations between the data objects based on usage and access patterns. In block 206, the workload discovery engine 150 uses the associations to identify sub-workloads of the meta workload that form consistency groups for replication. In block 208, the workload discovery engine 150 executes the sub-workloads. With embodiments, the sub-workloads may be created and executed, instead of executing the meta workload.

For example, transactions that contain updates to the same data objects (e.g., tables, files, databases, etc.) may be looked at. With this example, those transactions originate from a specific application, which can be derived in those same logs. The set of data objects then should all belong in the same workgroup and analyzing all transactions that intersect will expand the data objects in the workgroup.

The entirety of the changes in the recovery log 112 and the replication log stream 142 constitute the meta workload from which embodiments identify relationships to create consistency groups, which are also referred to as sub-workloads.

Merely to enhance understanding, the basic flow of this workload discovery work is provided by imagining a given change stream that contains more than one actual workload.

With embodiments, the set of changes, in the replication change stream 142, are derived by DBMS Create, Read, Update, Delete (CRUD) operations that are logged by the DBMS a recovery log 112. In various embodiments, the implementation details for such recovery logs 112 may vary, but the following are common properties that enable successful replication:

- An ordered (or orderable) recovery log of discrete, time-stamped, log records depicting the Data Manipulation Language (DML) operations (e.g., Insert, Update Delete, etc.).
- The presence of transactional semantics in those log records.
- The presence of audit information for the DML operations (e.g., application job name, user name, etc.).
- Additional properties for replication, such as before and after images, Data Definition Language (DDL)/Utility operations, etc.

The analytics engine 130 may detect simple and complex associations such as:

- The set of data objects that are updated by a given, unique, application 'X'
- The set of data objects that are updated by a given set of applications.

The patterns of data access that allow for the sub-partitioning of data objects. These patterns of data access effectively constitute a non-temporal form of dependency analysis.

The patterns of shared data access that indicate certain data objects are audit objects (e.g., memo-post, etc.) and that their commutative nature allows them to be included into a separate workload to avoid deadlocks.

The set of data objects that are referenced together in transactions (e.g., any transaction containing an operation on an object in this set only includes operations for other objects in this set).

With embodiments, in some more complex environments, multiple and/or alternate log sources may be used. For instance, some applications may operate in a non-logged configuration, from a DBMS point of view. Even in these cases, audit information from other sources may be utilized to identify "application to data object" associations. Examples include metrics databases, used for monitoring (e.g. Simple Network Management Protocol (SNMP) databases). and system audit databases.

Another source of workload discovery may be application source code listings.

Once all available sources are scrubbed and suggested workload groupings are produced, a second phase identifies additional properties, such as network addressability. This is for routing purposes, which also take into consideration the consistency group, or workload. However, even without the second-phase operations of physical re-partitioning of a monolithic meta workload into multiple workloads, resulting in increased operational granularity and performance, the knowledge of logical sub-partitions may be used to improve replication parallelism and apply performance within the original monolithic meta workload.

In yet another embodiment, the identification of two-phase commit transactions may be produced, using these same log sources. Two-phase commit transactions typically show up as normal DBMS transactions, in a given recovery log, but may also contain global transaction identifiers. Resource recovery coordinators 162, used to enact the two-phase commit transactions, may also have logs that would further identify participants (e.g., records or rows in a data object). The identification of these artifacts provide a suggested association between otherwise distinct workloads that may be used by replication engines for roll-up synchronization at replication stop and switch times.

Embodiments give customers a valuable and re-usable tool to define and refine workload definitions.

Embodiments extend existing dependency analysis with analytic engines to find transactions affecting sets of resources and creating consistency groups from disjoint sets.

Embodiments use analytic engines to identify replication workloads by feeding in information sources, such as recovery logs or replication change streams, for identification of discrete sub-workloads.

Figure 3:
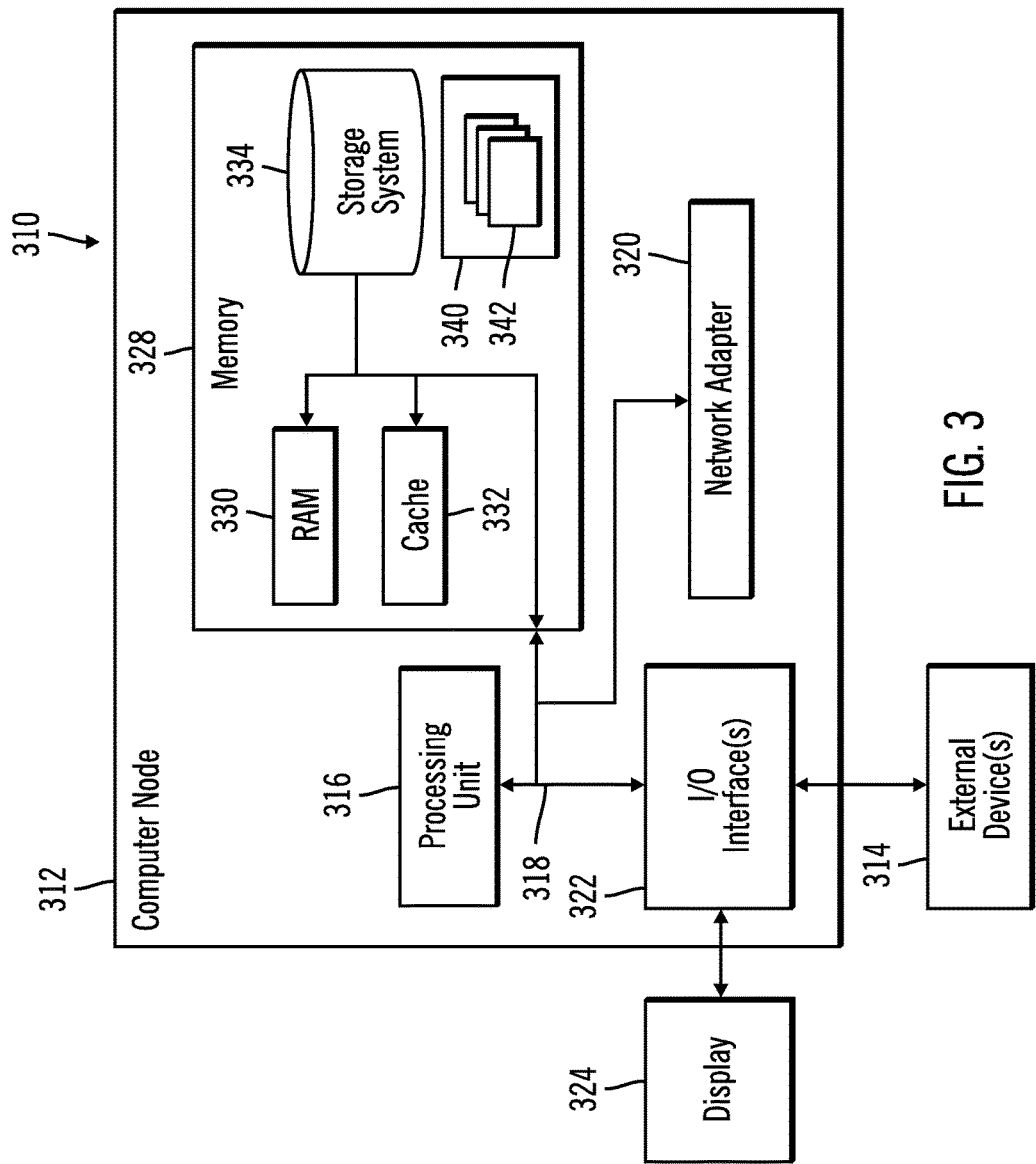
FIG. 3 illustrates a computing node in accordance with certain embodiments.

Referring now to FIG. 3, a schematic of an example of a computing node is shown. Computing node 310 is only one example of a suitable computing node and is not intended to suggest any limitation as to the scope of use or functionality of embodiments of the invention described herein. Regardless, computing node 310 is capable of being implemented and/or performing any of the functionality set forth hereinabove.

In computing node 310 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in computing node 310 is shown in the form of a general-purpose computing device. The components of computer system/server 312 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

In certain embodiments, the server computer 100 has the architecture of computing node 310. In certain embodiments, the server computer 100 is part of a cloud environment. In certain alternative embodiments, the server computer 100 is not part of a cloud environment.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
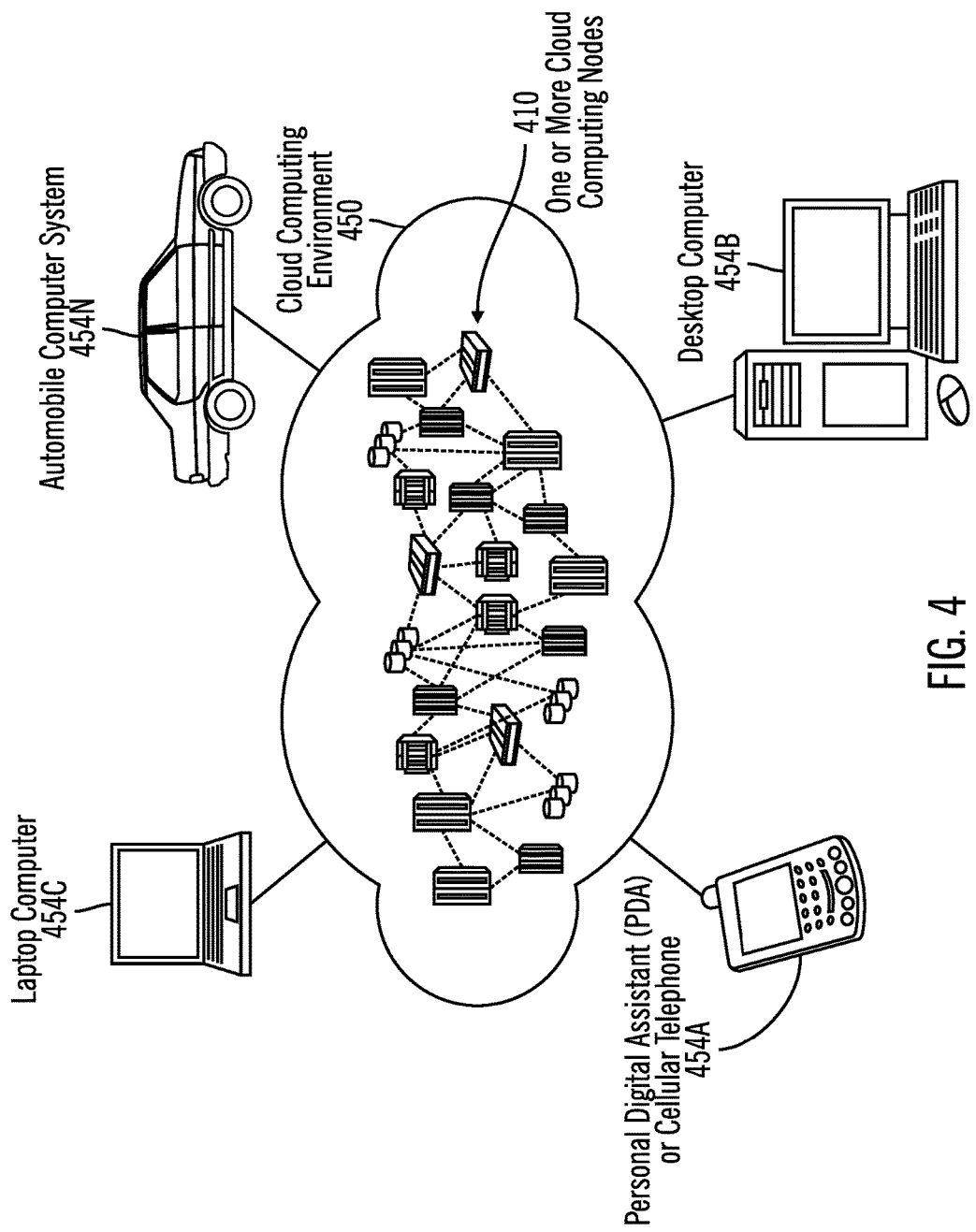
FIG. 4 illustrates a cloud computing environment in accordance with certain embodiments.

Referring now to FIG. 4, illustrative cloud computing environment 450 is depicted. As shown, cloud computing environment 450 comprises one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 410 and cloud computing environment 450 can communicate with any type of computerized device over any type of network and/or network addressable connection (e.g., using a web browser).

Figure 5:
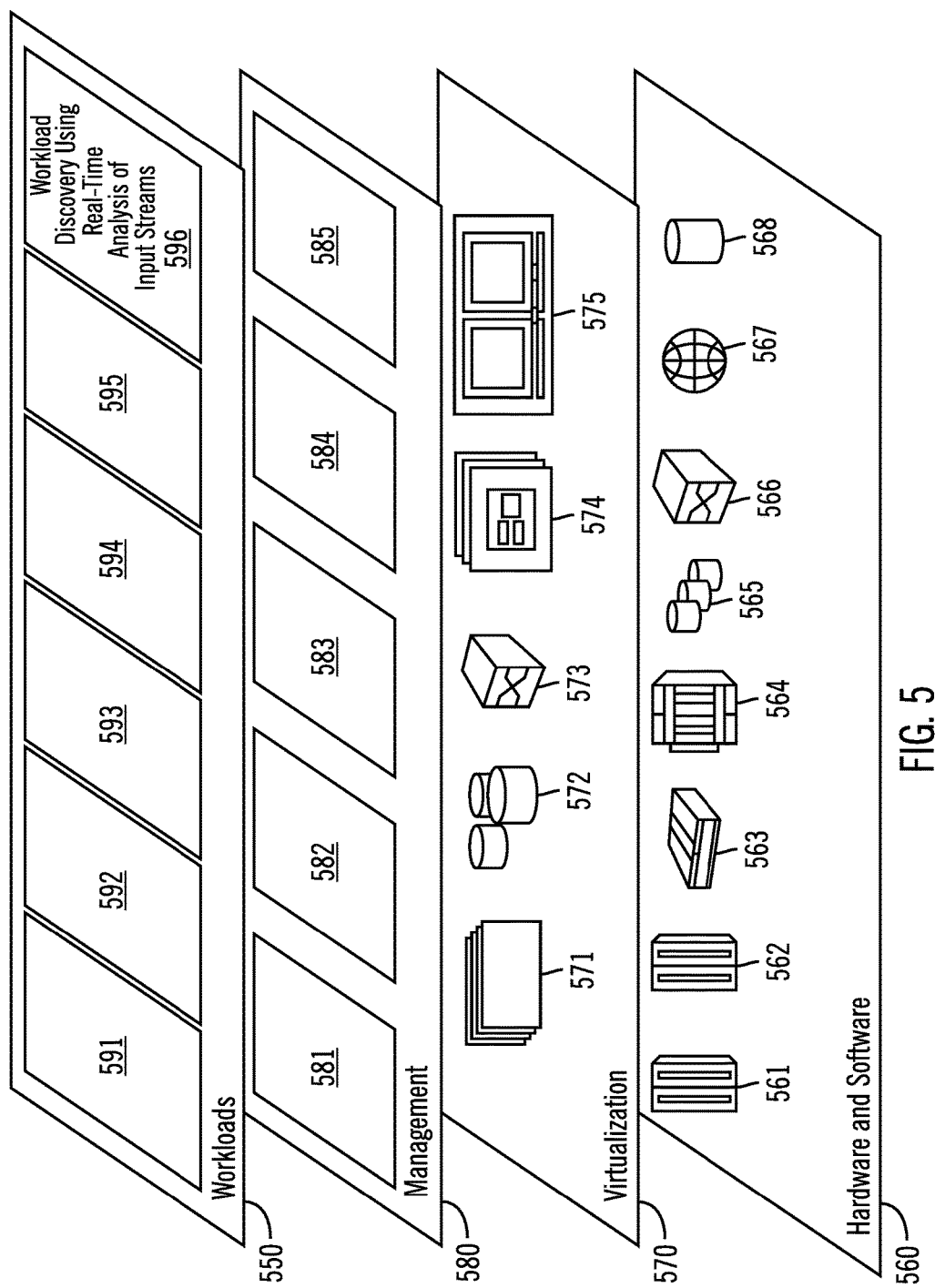
FIG. 5 illustrates abstraction model layers in accordance with certain embodiments.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and workload discovery using real-time analysis of input streams 596.

Thus, in certain embodiments, software or a program, implementing workload discovery using real-time analysis of input streams in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   identifying, with a processor of a computer, a single workload for analysis;
   storing, with the processor of the computer, changes to data objects in a source copy made by change operations that are in a replication change stream into a recovery log;
   identifying, with the processor of the computer, associations between the data objects and a plurality of applications based on usage and access patterns in one of the recovery log and the replication change stream, wherein the associations comprise any combination of:
   a) a set of the data objects that are updated by a particular application of the plurality of applications;
   b) a set of the data objects that are updated by a given set of applications of the plurality of applications;
   c) patterns of data access of the data objects;
   d) patterns of shared data access of the data objects; and
   e) a set of the data objects that are referenced together in transactions; and
   using, with the processor of the computer, the associations to identify change operations that form consistency groups for replication from the source copy to a target copy, and wherein the consistency groups comprise sub-workloads; and
   executing, with the processor of the computer, the change operations of the sub-workloads to perform the replication for the single workload, wherein the change operations within each of the sub-workloads are executed such that the target copy is a replica of the source copy at a given point in time, and wherein the sub-workloads provide increased granularity.

2. The method of claim 1, wherein the recovery log includes transactional semantics for recovery log records, and wherein the recovery log includes audit information for the change operations.

3. The method of claim 1, further comprising:
   using the recovery log to identify two-phase commit transactions for roll-up synchronization.

4. The method of claim 1, wherein the sub-workloads are used for one of partitioning and optimized processing.

5. The method of claim 1, wherein the sub-workloads are used for replication optimization.

6. The method of claim 1, wherein software is provided as a service in a cloud environment.

7. A computer program product, the computer program product comprising a non-transitory computer readable storage medium having program code embodied therewith, the program code executable by at least one processor to perform:
   identifying a single workload for analysis;
   storing changes to data objects in a source copy made by change operations that are in a replication change stream into a recovery log;
   identifying associations between the data objects and a plurality of applications based on usage and access patterns in one of the recovery log and the replication change stream, wherein the associations comprise any combination of:
   a) a set of the data objects that are updated by a particular application of the plurality of applications;

b) a set of the data objects that are updated by a given set of applications of the plurality of applications;
c) patterns of data access of the data objects;
d) patterns of shared data access of the data objects; and
e) a set of the data objects that are referenced together in transactions;

using the associations to identify change operations that form consistency groups for replication from the source copy to a target copy, and wherein the consistency groups comprise sub-workloads; and executing the change operations of the sub-workloads to perform the replication for the single workload, wherein the change operations within each of the sub-workloads are executed such that the target copy is a replica of the source copy at a given point in time, and wherein the sub-workloads provide increased granularity.

8. The computer program product of claim 7, wherein the recovery log includes transactional semantics for recovery log records, and wherein the recovery log includes audit information for the change operations.

9. The computer program product of claim 7, wherein the program code is executable by the at least one processor to perform:
using the recovery log to identify two-phase commit transactions for roll-up synchronization.

10. The computer program product of claim 7, wherein the sub-workloads are used for one of partitioning and optimized processing.

11. The computer program product of claim 7, wherein the sub-workloads are used for replication optimization.

12. The computer program product of claim 7, wherein a Software as a Service (SaaS) is configured to perform computer program product operations.

13. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations, wherein the operations comprise:
identifying a single workload for analysis;
storing changes to data objects in a source copy made by change operations that are in a replication change stream into a recovery log;
identifying associations between the data objects and a plurality of applications based on usage and access patterns in one of the recovery log and the replication change stream, wherein the associations comprise any combination of:
a) a set of the data objects that are updated by a particular application of the plurality of applications;
b) a set of the data objects that are updated by a given set of applications of the plurality of applications;
c) patterns of data access of the data objects;
d) patterns of shared data access of the data objects; and
e) a set of the data objects that are referenced together in transactions;

using the associations to identify change operations that form consistency groups for replication from the source copy to a target copy, and wherein the consistency groups comprise sub-workloads; and executing the change operations of the sub-workloads to perform the replication for the single workload, wherein the change operations within each of the sub-workloads are executed such that the target copy is a replica of the source copy at a given point in time, and wherein the sub-workloads provide increased granularity.

14. The computer system of claim 13, wherein the recovery log includes transactional semantics for recovery log records, and wherein the recovery log includes audit information for the change operations.

15. The computer system of claim 13, wherein the operations further comprise:
using the recovery log to identify two-phase commit transactions for roll-up synchronization.

16. The computer system of claim 13, wherein the sub-workloads are used for one of partitioning and optimized processing.

17. The computer system of claim 13, wherein a Software as a Service (SaaS) is configured to perform computer system operations.

* * * * *